(12) United States Patent
Redzisz

(10) Patent No.: US 6,789,713 B1
(45) Date of Patent: Sep. 14, 2004

(54) FISHING ROD CASE

(75) Inventor: Andrezj Redzisz, Skokie, IL (US)

(73) Assignee: Travel Caddy, Inc., IL (US)

( * ) Notice: Subject to any disclaimer, the term of this patent is extended or adjusted under 35 U.S.C. 154(b) by 0 days.

(21) Appl. No.: 09/876,809

(22) Filed: Jun. 7, 2001

(51) Int. Cl.[7] .............................................. A45C 15/00
(52) U.S. Cl. .................. 224/578; 206/315.11; 224/600; 224/922
(58) Field of Search ................................. 224/578, 913, 224/917, 922, 579, 602, 604, 600; 206/315.11

(56) References Cited

U.S. PATENT DOCUMENTS

| | | | | |
|---|---|---|---|---|
| 3,033,259 A | * | 5/1962 | Landis, Sr. ............. | 206/315.11 |
| 5,277,306 A | * | 1/1994 | Sargent ....................... | 150/154 |
| 5,488,799 A | * | 2/1996 | Hauschild .................... | 224/586 |
| D395,360 S | * | 6/1998 | Schrader, Jr. ................ | D3/260 |
| 5,884,737 A | * | 3/1999 | Cabo .......................... | 190/109 |
| 5,975,393 A | * | 11/1999 | Bellamy ................. | 206/315.11 |
| 6,119,907 A | * | 9/2000 | Benjamin ................... | 224/150 |
| D442,367 S | * | 5/2001 | Terrell ......................... | D3/260 |

* cited by examiner

Primary Examiner—Gregory Vidovich
Assistant Examiner—Maerena W. Brevard
(74) Attorney, Agent, or Firm—Banner & Witcoff, Ltd.

(57) ABSTRACT

A fishing rod case is comprised of a flexible longitudinal bag with a storage pouch on one side and an adjustable length strap at the closed end of the bag connectable to the opposite end so that it may serve as a tackle storage case easily carried by the fisherman during use.

1 Claim, 2 Drawing Sheets

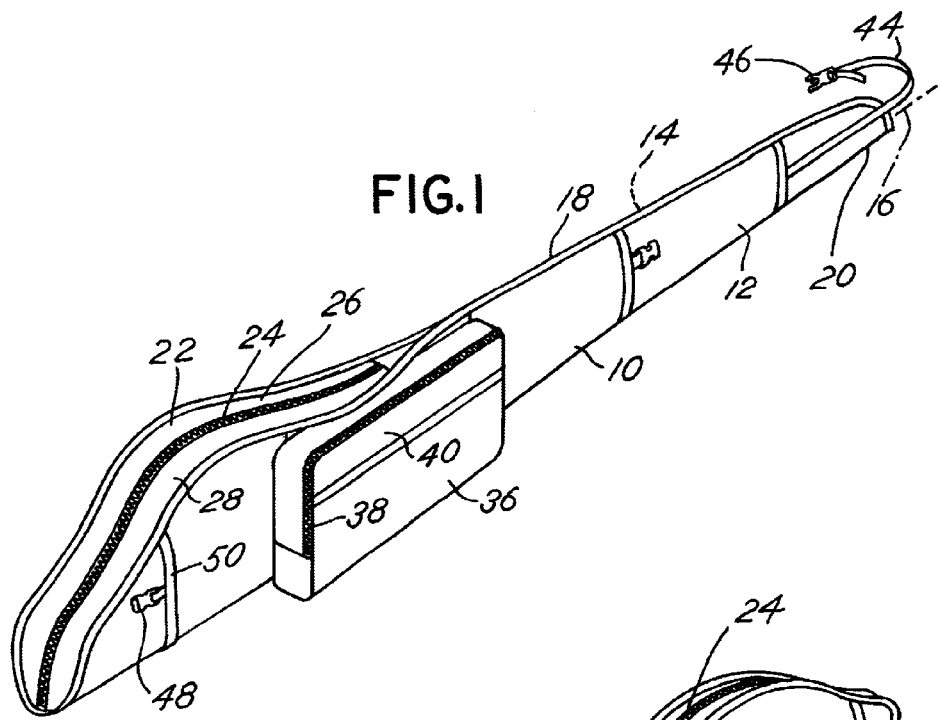
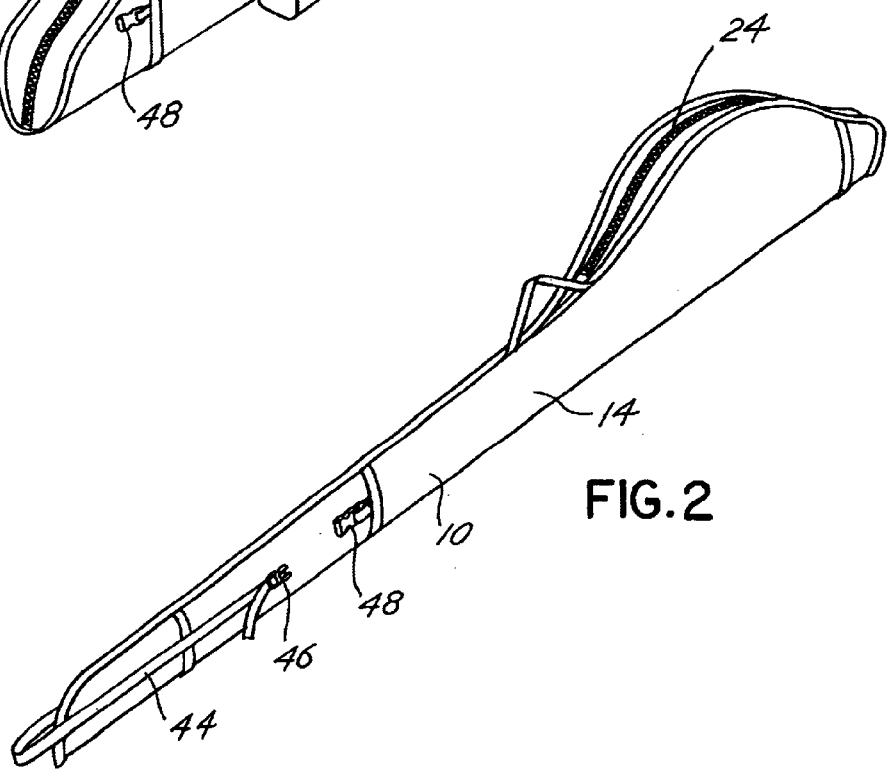

FISHING ROD CASE

BACKGROUND OF THE INVENTION

In a principal aspect the present invention relates to a fishing rod case and, more particularly, to a fishing rod case that is convertible into a belted tackle pouch.

Fishermen often desire to provide a protective case for their fishing rod. Fly rods, especially, require protection in a case. Typical fly rods include multiple sections that fit together to form an elongate rod with a reel at one end and a top at the opposite end. Placement of the sections comprising such a rod in a protective case is a desirable objective. Thus, fishing equipment of the type described is typically and desirably stored in a protective case when not in use.

It is often desirable to proceed to a fishing area, not only with a fishing rod in its protective case, but also with appropriate lures, flys, and other fishing equipment. Consequently, a separate pouch or creel is normally carried by a fisherman. However, transport of multiple pouches, a creel, a fishing rod case, and the like may be cumbersome and difficult. Thus there has developed the need for an improved fishing rod case that may have multiple utilitarian purposes.

SUMMARY OF THE INVENTION

Briefly, the present invention comprises a fishing rod case which is in the form of an elongate, flexible bag closed at one end and with a zippered opening at its opposite end. The case further includes an outside pouch as well as an elongate and adjustable strap with buckles which enable the strap to be attached between the ends of the bag thereby forming a closed loop that has an adjustable circumference so that the bag may be fitted over the shoulder or around the torso or waist of an individual and serve as a tackle storage pouch.

Thus it an object of the invention to provide an improved fishing rod case construction.

It is a further object of the invention to provide a fishing rod case construction that is flexible and has multiple uses including a use as a tackle storage pouch.

Yet another object of the invention is to provide a fishing rod case construction that may be utilized as a tackle storage pouch by fastening about the waist or shoulder of an individual and which is adjustable to accommodate varying waist or shoulder size measurements.

Yet another object of the invention is to provide a fishing rod case which is lightweight, easily transportable, inexpensive and easy to convert between a tackle storage pouch or carrier and a fishing rod case.

These and other objects, advantages, and features will be set forth in the detailed description which follows.

BRIEF DESCRIPTION OF THE DRAWING

In the detailed description which follows reference will be made to the drawing comprised of the following figures:

FIG. 1 is an isometric view of the fishing rod case wherein the case includes an elongate fishing rod storage therein;

FIG. 2 is an isometric view of the inside face of the fishing rod case of FIG. 1;

DESCRIPTION OF THE PREFERRED EMBODIMENT

Figure 3:
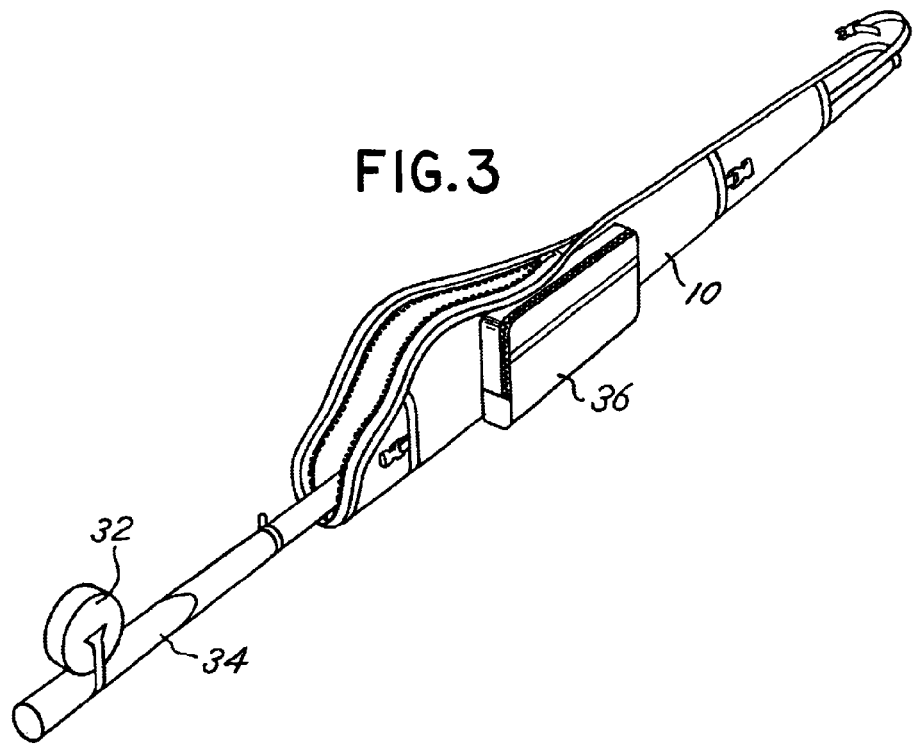
FIG. 3 is an isometric view of the case of FIG. 1 wherein the rod has been partially removed from the case.

The fishing rod case of the invention is comprised of a flexible fabric material, most typically a waterproof fabric or nylon material. Various fabrics may be utilized but most preferably a waterproof fabric is desired in order to protect the contents of the case. As shown in FIG. 1, the case comprises an elongate bag 10 having an outside panel 12 and an inside panel 14. The bag 10 may be made from a single piece of fabric or material which is folded about an elongate axis 16 with binding 18 stitched along one side where the folds are joined together. The bag 10 includes a distal end 20 which is closed by virtue of the binding or sewing operation. An open end 22 is provided with a zipper 24 for access through the open end 22. The zipper 24 is positioned to engage opposed elongate panels 26 and 28 which are sewn into the opening 22 defined by the single sheet of fabric defining the case 10. The open end 22 of the case 10 has a greater increased cross sectional area or dimension relative to the distal end 20 so that a reel, for example, reel 32 in FIG. 2 associated with a rod 34 may be fitted within the case 10 and retained comfortably therein.

Figure 4:
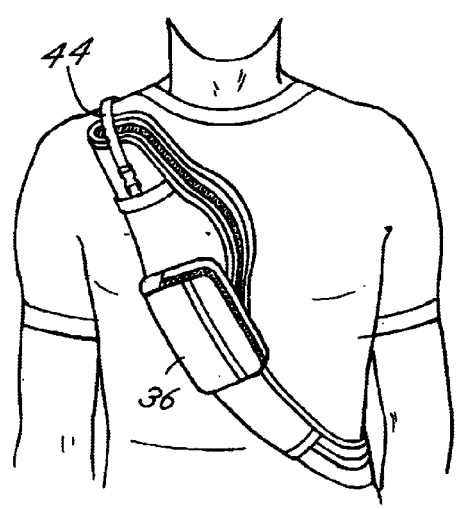
FIG. 4 is an isometric view of the case of FIG. 1 wherein the rod has been fully removed and the case is positioned over the shoulder of an individual to serve as a tackle carrier.
Figure 5:
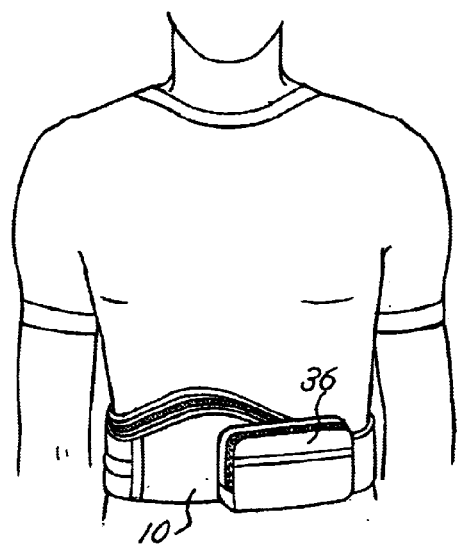
FIG. 5 is an isometric view of the carrying case of FIG. 1 wherein the fishing rod has been removed from the case and the case is strapped about the waist of an individual.

The outside panel or face 12 includes a pouch 36 which is a generally rectangular parallelepiped tackle pouch 36. The pouch 36 includes a top zipper opening 38 for access and retention of a flap 40 along the front side of the pouch 36. The pouch 36 may be sewn to the outside face 12 or attached thereto by fasteners, such as Velcro fasteners, or the like. In the preferred embodiment the pouch 36 is permanently attached to the outside face 12 of the bag 10. Note that the zipper 38 extends generally parallel to the zipper 24. The zippers 38 and 24 are thus accessible from the same side or the top side of the bag 10. This becomes important for access to the pouch 36 as well as to the case or bag 10 when the case is utilized as depicted in FIG. 4 and FIG. 5.

The distal end 20 includes a flexible strap 44 adjustably attached to a male buckle element 46. A female buckle element 48 is affixed to the midpoint of a binding strap 50 on the outside face 12 at the open end 22 of the case 10. The female buckle element 48 may be engaged with the male element 46 to fit the bag 10 around the shoulder of an individual as depicted in FIG. 4 or about the waist of an individual as depicted in FIG. 5. Since the strap 44 is adjustable in length with respect to the buckle element 46, accommodation for length is easily made for fitting around the waist or over the shoulder of an individual. Also, it should be noted that the zipper 38 as well as the zipper 24 are oriented for ease of access by an individual whether the bag 10 is around the waist or over the shoulder again as depicted in FIGS. 4 and 5.

In use then, a fisherman will carry the rod or pole 34 with a reel 32 thereon to the fishing site, remove the pole 34 and the reel 32, and then close the zipper 24. Thereafter the fisherman can easily store the carrying case 10 around his waist or shoulder, have easy access to the tackle pouch 36, and also have easy access to the bag 10 by release of the zipper 24. The interior of the case 10 may include a removable plastic container so that fish, which are caught, can be temporarily stored in the plastic bag within the case 10.

Referring to FIG. 2 it will be noted that the strap 44 with the male buckle element 46 may be joined to a female buckle element 60 on the back face or surface 14 of the case 10. The adjustable strap 44 may then be thus fitted over the shoulder of an individual and the case 10 with the contents including a rod therein carried over the shoulder of said individual. Thus the case 10 may be carried over the shoulder of an individual when the rod 34 is within the case 10 or alternatively around the waist or shoulder of an individual when the rod is removed and the case 10 is in the flexible mode.

It is possible to vary the construction of the fishing bag or fishing rod case without departing from the spirit and scope of the invention. That is, various changes can be made including the inclusion of multiple pouches, pouches with multiple zippers, and the like. Thus the invention is being limited only by the following claim and improvements thereof.

What is claimed is:

1. A case comprising, in combination:

a flexible elongate bag having a longitudinal axis with a top side, a closed distal end and an open opposite end for receipt of an elongate rod or other elongate device, said bag including generally planar opposed sides, one of said sides defining a generally smooth inside face, the opposite side comprising an outside face with a pouch having a top side, said pouch attached to the outside face adjacent the open opposite ends said pouch top side including a zipper closure aligned with the axis;

a first buckle connector on the outside face;

a second buckle connector on the inside face;

a binding strap extending from the distal end of said bag with an adjustable buckle connector on the binding strap;

a zipper enclosure mechanism at the open end of said bag for opening and closing the open end, said zipper enclosure mechanism oriented with the longitudinal axis and on the top side of the bag, wherein an elongate rod may be stored in the bag by placement through the open end when said zipper enclosure mechanism is open, the flexible bag capable of being formed in a closed loop having an adjustable circumference over or around a torso or waist by engaging the first buckle connector and adjustable buckle connector, said second buckle connector and said adjustable buckle connector also being separately connectable to provide a means for carrying the case; and the zipper enclosure mechanisms of said pouch and said bag being accessible for providing access simultaneously to both the bag and the pouch from their respective top sides.

* * * * *